US008813150B2

(12) United States Patent
Tsunashima

(10) Patent No.: US 8,813,150 B2
(45) Date of Patent: Aug. 19, 2014

(54) BROADCAST RECEIVING DEVICE AND BROADCAST RECEIVING SYSTEM

(75) Inventor: Kenji Tsunashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 500 days.

(21) Appl. No.: 13/093,395

(22) Filed: Apr. 25, 2011

(65) Prior Publication Data

US 2011/0302602 A1    Dec. 8, 2011

(30) Foreign Application Priority Data

Jun. 4, 2010  (JP) ................................. 2010-128707
Nov. 19, 2010  (JP) ................................. 2010-258813

(51) Int. Cl.
*H04N 7/173*    (2011.01)
*H04N 7/18*    (2006.01)
*H04N 21/84*    (2011.01)
*H04N 21/6547*    (2011.01)

(52) U.S. Cl.
CPC ........... *H04N 21/84* (2013.01); *H04N 7/17318* (2013.01); *H04N 21/6547* (2013.01)
USPC .............................. 725/110; 725/82; 725/133

(58) Field of Classification Search
CPC   H04N 21/84;  H04N 7/17318;  H04N 21/6547
See application file for complete search history.

(56) References Cited

U.S. PATENT DOCUMENTS

| 6,718,551 | B1* | 4/2004 | Swix et al. ....................... 725/32 |
| 7,617,515 | B1* | 11/2009 | Laksono ............................ 725/93 |
| 2005/0210513 | A1* | 9/2005 | Szucs et al. ....................... 725/80 |

FOREIGN PATENT DOCUMENTS

| JP | 2001-94966 A | 4/2001 |
| JP | 2005-284195 A | 10/2005 |

* cited by examiner

*Primary Examiner* — Mark D Featherstone
(74) *Attorney, Agent, or Firm* — Birch, Stewart, Kolasch & Birch, LLP

(57) ABSTRACT

A broadcast receiving device includes: a display control unit for causing a display unit to display a video based on received data; an input unit, through which information input operation is performed; a first network communication unit communicably connected to a wide area network; a second network communication unit communicably connected to an information processing device; a network bridge processing unit for creating a bridge connection between the first network communication unit and the second network communication unit to make possible communication between the information processing device and the wide area network; and a user interface providing unit for receiving graphical user interface generated by the information processing device via the second network communication unit and supplying graphics data based on the graphical user interface to the display control unit, the user interface providing unit supplying information inputted from the input unit to the information processing device via the second network communication unit.

14 Claims, 8 Drawing Sheets

FIG. 3

GET /path/file.mpg HTTP/1.0    } REQ1
From: user@mitsubishi.com                    } REQ
User-Agent: HTTPTool/1.0        } REQ2

FIG. 4

HTTP/1.0 200 OK                              } RES1
Date: Fri, 31 Dec 1999 23:59:59 GMT                 } RES
Content-Type: video/mpeg         } RES2
Content-Length: 1354

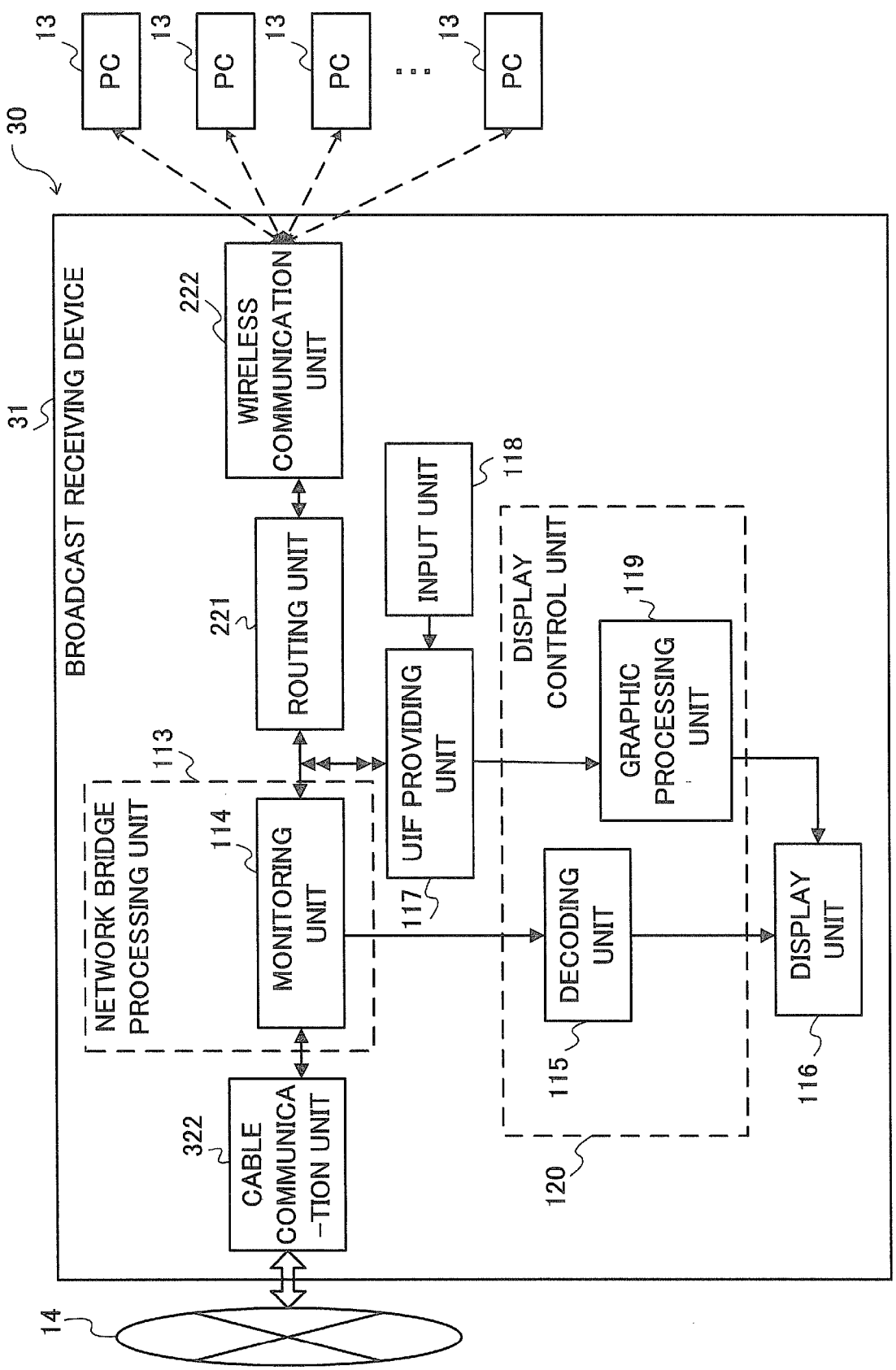

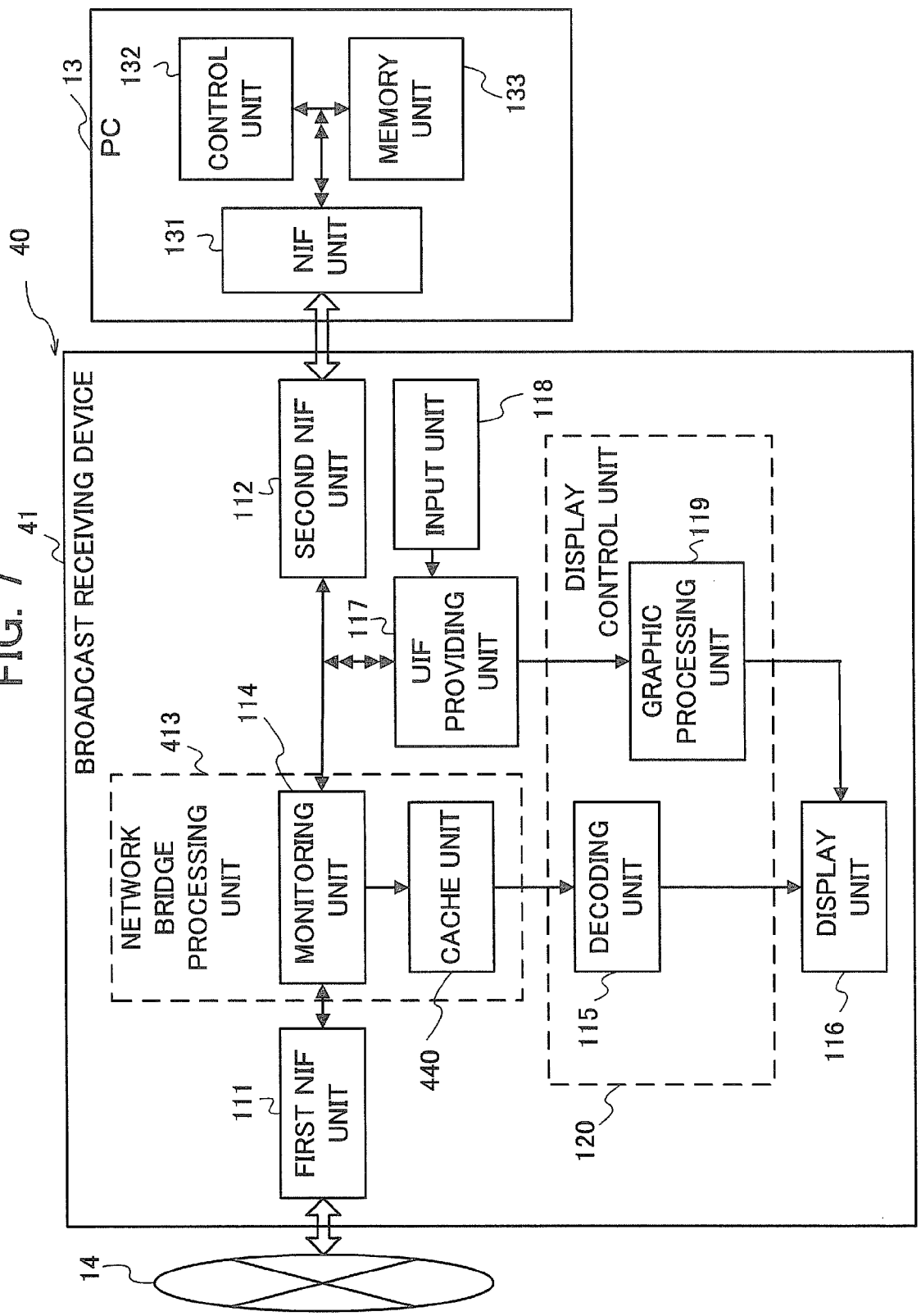

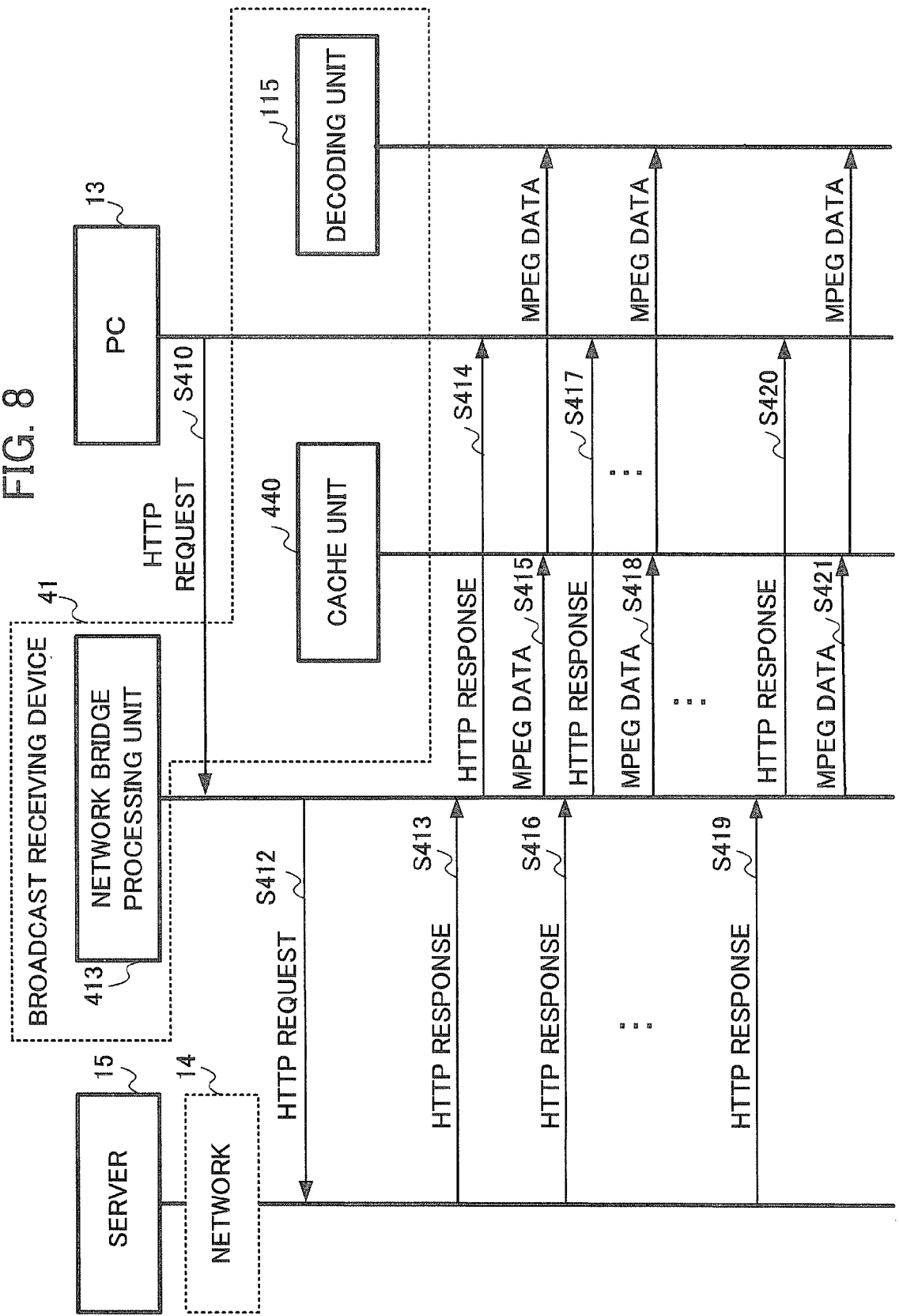

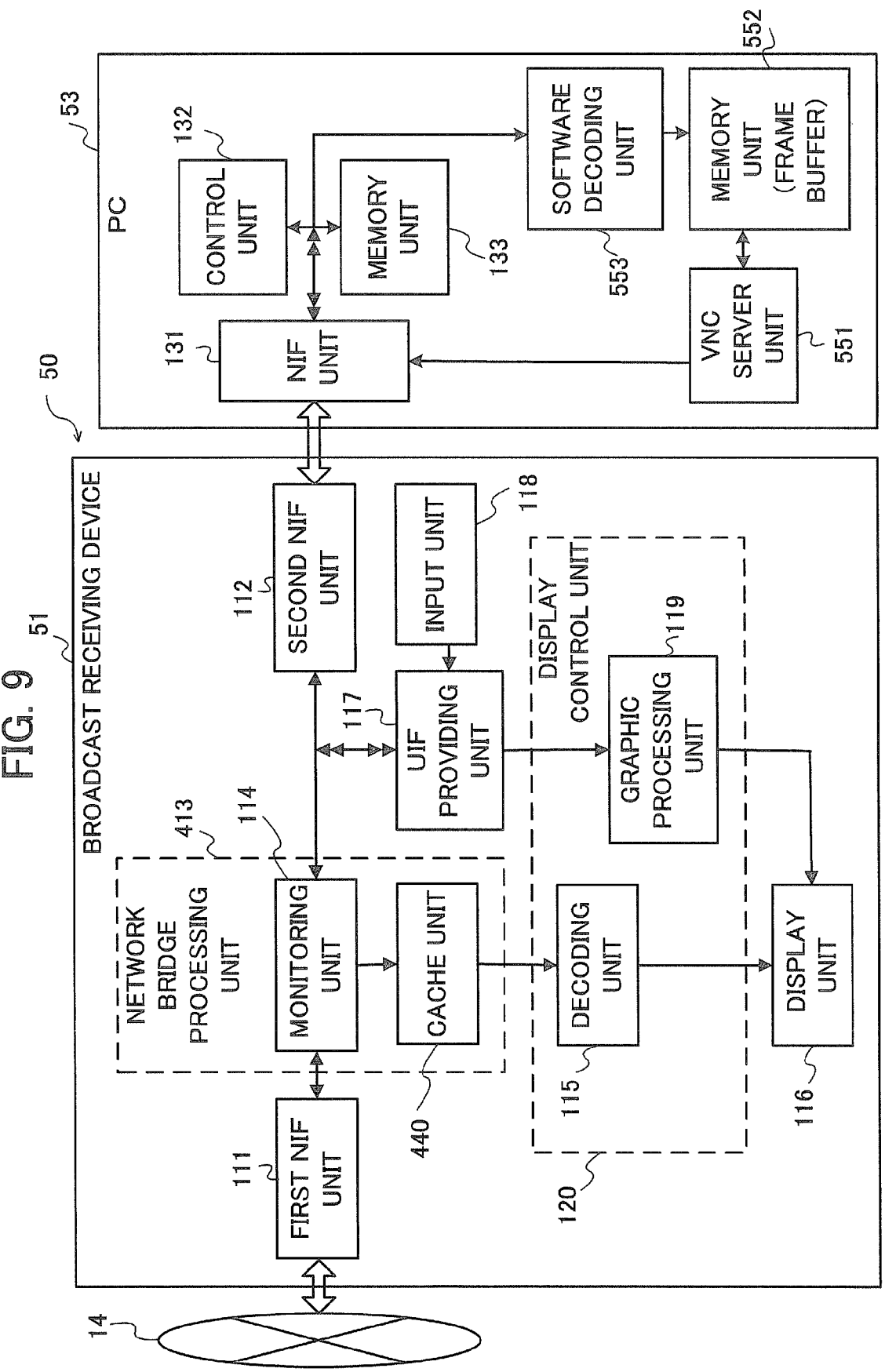

BROADCAST RECEIVING DEVICE AND BROADCAST RECEIVING SYSTEM

BACKGROUND OF THE INVENTION

1. Field of the Invention

The present invention relates to a broadcast receiving device which is communicably connected to a wide area network and a broadcast receiving system which includes the broadcast receiving device.

2. Description of the Related Art

Video distribution over the Internet is spreading, concurrently with development of higher-performance personal computers (PCs) and use of wider bandwidth for internet access. In the video distribution over the Internet, a video signal is compressed by using video compression technology such as MPEG (Moving Picture Experts Group) to obtain a compressed signal, and the compressed signal is transmitted to a PC over a network. The PC decodes the compressed signal and displays a video corresponding to the decoded video signal on a monitor.

Furthermore, digital television broadcasting is also rapidly progressed. In the digital television broadcasting, a video signal is compressed according to the MPEG standard to obtain digital streaming data, and the digital streaming data is transmitted on a carrier wave to a home digital TV.

Both of the video distribution over the Internet and the digital television broadcasting use similar digital video/audio streams. Videos distributed over the Internet generally reach PCs; on the other hand, digital television broadcasts are generally viewed on digital TV receivers.

By additionally having digital television broadcast receiving tuners, the PCs can display digital broadcast videos on PC screens. On the other hand, internet TVs have been developed as the digital TV receivers capable of viewing streaming data transmitted over a network. An example of the internet TV is disclosed in Japanese Patent Kokai Publication No. 2001-94966 (FIG. 1), which is referred to as "Patent Document 1".

Generally, in a case of the digital TV receivers which additionally have a function of accessing the Internet, users selects contents from the Internet by using a browser or the like and the digital television receivers display a picture base on the selected contents on TV screens. The digital TV receivers generally have built-in processors. Some built-in processors are insufficient in processing capability to produce and display a graphical user interface such as a browser, and others are not capable of mounting the graphical user interface such as a browser. Some browsers which can be installed on the built-in processors are inferior to browsers on PCs in performance, such as available website descriptions: a website can be displayed by a browser on a PC, whereas the website cannot be displayed by a browser on a built-in processor. These problems of the digital TV receivers can be solved by improving performance of the built-in processors or improving hardware performance such as increasing memory size. However, improving the hardware performance causes an increase in cost of the devices.

Moreover, because the digital TV receivers use decoders which are hardware devices for solely processing received compression signals, it is difficult for the digital TV receivers to receive signals other than signals designated in the hardware devices in advance.

SUMMARY OF THE INVENTION

An object of the present invention is to provide a broadcast receiving device and a broadcast receiving system capable of displaying a picture based on video content received from a wide area network without installation of software which increases load.

According to an aspect of the present invention, a broadcast receiving device includes: a display control unit for causing a display unit to display a video based on received data; an input unit, through which information input operation is performed; a first network communication unit communicably connected to a wide area network; a second network communication unit communicably connected to an information processing device; a network bridge processing unit for creating a bridge connection between the first network communication unit and the second network communication unit to make possible communication between the information processing device and the wide area network; and a user interface providing unit for receiving graphical user interface generated by the information processing device via the second network communication unit and supplying graphics data based on the graphical user interface to the display control unit, the user interface providing unit supplying information inputted from the input unit to the information processing device via the second network communication unit.

According to another aspect of the present invention, a broadcast receiving system includes: the above-described broadcast receiving device; and an information processing device communicably connected to the second network communication unit of the broadcast receiving device; wherein the information processing device includes a second decoding unit for decoding video data included in communication data received via the first network communication unit, the network bridge processing unit and the second network communication unit of the broadcast receiving device; a memory unit for temporarily storing the video data decoded by the second decoding unit; and a server unit for transferring the video data stored in the memory unit to the broadcast receiving device as bit map data.

According to the present invention, the broadcast receiving device and the broadcast receiving system can display pictures based on various video contents received from a wide area network without installation of software which increases load.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a diagram illustrating an example of a format of a HTTP request in the first and fourth embodiments;

FIG. 4 is a diagram illustrating an example of a format of a HTTP response in the first and fourth embodiments;

FIG. 6 is a block diagram schematically illustrating a structure of a broadcast receiving system according to a third embodiment;

FIG. 7 is a block diagram schematically illustrating a structure of a broadcast receiving system according to the fourth embodiment;

FIG. 8 is a sequence diagram illustrating an example of operations of the broadcast receiving system according to the fourth embodiment; and FIG. 9 is a block diagram schematically illustrating a structure of a broadcast receiving system according to a fifth embodiment.

DETAILED DESCRIPTION OF THE INVENTION

Figure 1:
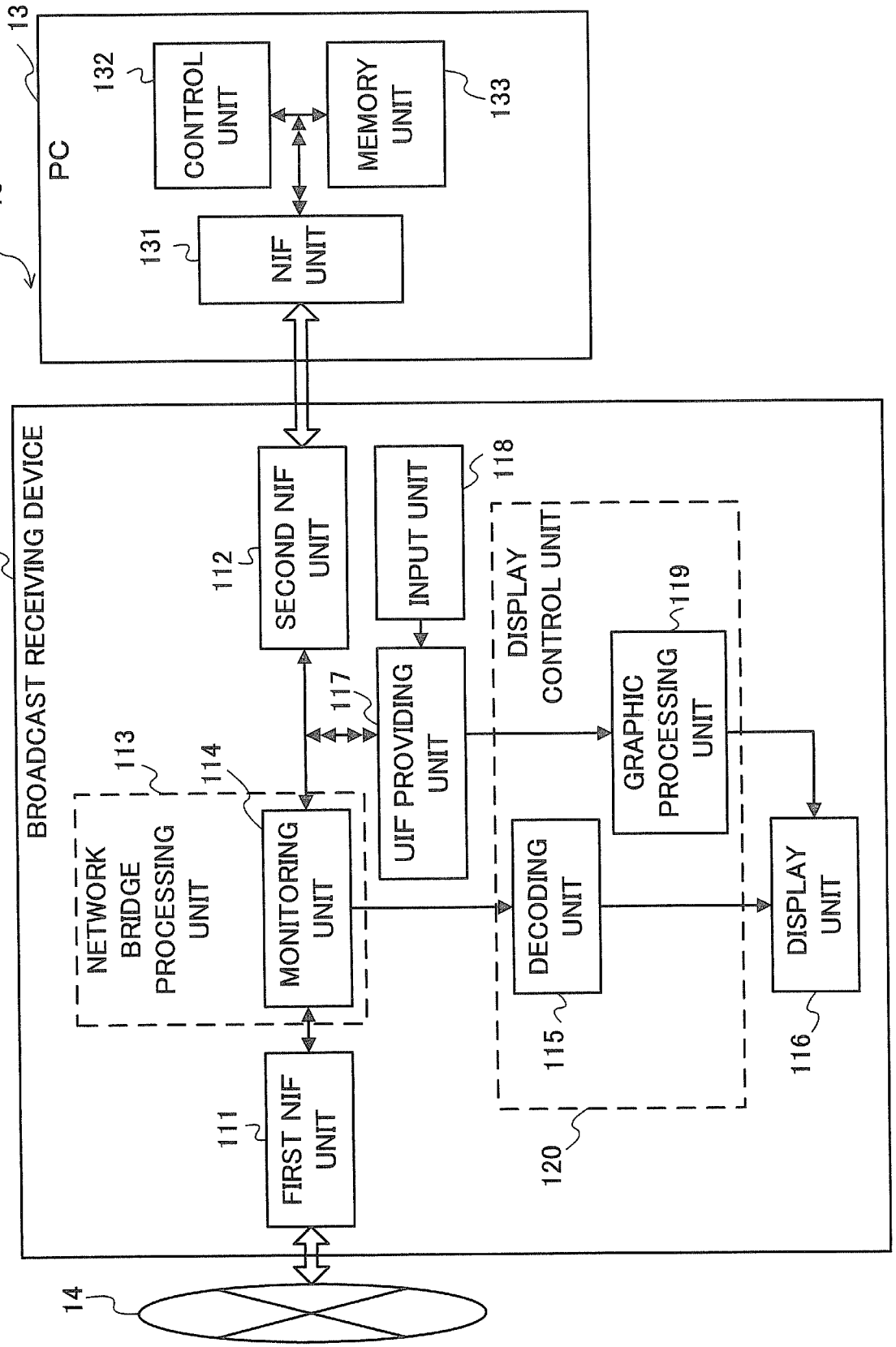
FIG. 1 is a block diagram schematically illustrating a structure of a broadcast receiving system according to a first embodiment.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Overview of Embodiments

Generally, when streaming content distributed over the Internet as a wide area network is viewed on a broadcast receiving device such as a digital TV, a browser installed on the broadcast receiving device is used for searching and selecting the content and performing other operations.

However, the broadcast receiving device has a built-in processor which is inferior to a built-in CPU of a PC in processing ability, and the broadcast receiving device works with a memory of a less capacity in comparison with the PC. For this reason, it is not easy that the broadcast receiving device is equipped with a browser of performance equivalent to a browser for the PC. Thus, the broadcast receiving device has restrictions on displaying streaming contents in most cases.

To cope with the problems, according to one aspect of the present invention, a broadcast receiving device is configured to receive streaming video content which is selected by using a browser on a PC and display a picture based on the video content on a screen of the broadcast receiving device, without increasing load on the built-in processor.

More specifically, according to the aspect of the present invention, the broadcast receiving device is configured to access the Internet from the PC via the broadcast receiving device, to transmit from the PC to the broadcast receiving device a graphical user interface including bitmap for a browser displayed on a screen of the PC and the like, and thereby to make it possible to select contents by operating an input device such as a remote controller while viewing the screen of the broadcast receiving device.

Furthermore, according to another aspect of the present invention, the broadcast receiving device is configured to monitor, inside the broadcast receiving device, a request from the PC to the Internet and data transmitted in response to the request, to decode the transmitted data if it is judged that the transmitted data is video content, and to display the decoded data on the screen of the broadcast receiving device.

Moreover, according to a further aspect of the present invention, the broadcast receiving device is configured to include a cache unit for temporarily storing video contents pointed by a link on a web screen and sequentially downloaded by just a necessary amount for starting decoding even before selecting the content, thereby to start displaying video corresponding to the selected stream immediately after the selection. Thus, the streaming video content selected by using the browser on the PC is displayed on the screen of the broadcast receiving device. Therefore, the broadcast receiving device is capable of searching and selecting streaming content distributed over the Internet, without including any selection unit such as a browser. The broadcast receiving device is also capable of displaying the selected video content on the display unit of the broadcast receiving device, without waiting time after the selection of the video content.

The embodiments of the present invention will now be described in detail with reference to the attached drawings, in which like elements are indicated by like reference characters.

First Embodiment

FIG. 1 is a block diagram schematically illustrating a structure of a broadcast receiving system 10 according to a first embodiment. As illustrated in FIG. 1, the broadcast receiving system 10 includes a broadcast receiving device 11 and a PC 13 which is an information processing device.

The broadcast receiving device 11 includes a first network interface unit (hereinafter referred to as 'first NIF unit') 111 as a first network communication unit, a second network interface unit (hereinafter referred to as 'second NIF unit') 112 as a second network communication unit, a network bridge processing unit 113 having a monitoring unit 114, a decoding unit 115, a display unit 116, a user interface providing unit (hereinafter referred to as 'UIF providing unit') 117, an input unit 118, and a graphic processing unit 119. The decoding unit 115 and the graphic processing unit 119 form a display control unit 120.

The first NIF unit 111 is an interface for sending and receiving information to/from Internet 14 which is a wide area network. The first NIF unit 111 is connected to the Internet 14 via a router which is not illustrated in the drawing or the like, for example. The second NIF unit 112 is an interface for sending and receiving information to/from the PC 13. The second NIF unit 112 is connected to the PC 13 through a cross cable or the like, for example.

The network bridge processing unit 113 creates a bridge connection between the first NIF unit 111 and the second NIF unit 112. Thus, the PC 13 connected to the second NIF unit 112 can connect to the Internet 14 on a side of the first NIF unit 111 via the network bridge processing unit 113. The broadcast receiving device 11 can be considered as a proxy server which is inserted between the Internet 14 and the PC 13.

Furthermore, the network bridge processing unit 113 includes the monitoring unit 114 for monitoring HTTP-based communication between the PC 13 and the Internet 14. The monitoring unit 114 extracts video streaming data transmitted from the Internet 14 to supply to the decoding unit 115. The monitoring unit 114 also provides the PC 13 with the video streaming data transmitted from the Internet 14, via the second NIF unit 112.

The decoding unit 115 decodes the video streaming data received from the monitoring unit 114 and supplies the decoded video signal to the display unit 116. The display unit 116 is a display device such as a liquid crystal display for displaying video corresponding to the video signal received from the decoding unit 115. The display unit 116 also displays a video corresponding to screen data supplied from the graphic processing unit 119.

A graphical user interface is transmitted from the PC 13 to the UIF providing unit 117 via the second NIF unit 112. On the basis of the graphical user interface transmitted from the PC 13, the UIF providing unit 117 remotely controls the PC 13. The remote control of the PC 13 can be easily realized by using VNC (Virtual Network Computing) software. The VNC software includes VNC server software and VNC client (viewer) software, for example, as described in Japanese Patent Kokai Publication No. 2005-284195 (Patent Document 2). A computer which executes the VNC server software (hereinafter referred to as 'server computer') produces a graphical user interface, the graphical user interface is transmitted over a network to another computer which executes the VNC client software (hereinafter referred to as 'client computer'), and the client computer causes a display unit to display a screen picture corresponding to the graphical user interface.

At the client computer, a user operates an input device (the input unit 118 in the first embodiment) such as a keyboard or a mouse. The client computer sends back to the server computer a user event corresponding to the user's input operation, and thereby the server computer can be remotely controlled. Thus, in a case of the broadcast receiving system of the first embodiment, by executing the VNC server software at the PC 13 and executing the VNC client software at the broadcast receiving device 11, the remote control of the PC 13 can be easily realized. The UIF providing unit 117 is realized by executing the VNC client software at a processor such as a built-in processor included in the broadcast receiving device 11 which is not illustrated in the drawing, for example.

Then, the UIF providing unit 117 produces graphics data by converting a format of the graphical user interface received via the second NIF unit 112, and supplies the graphics data to the graphic processing unit 119. The UIF providing unit 117 identifies a user event on the basis of an input at the input unit 118, and supplies the identified user event to the second NIF unit 112 to transmit to the PC 13.

The input unit 118 is a device through which a user inputs information such as a command and supplies the inputted information to the UIF providing unit 117. The input unit 118 can be configured by a remote controller or an operation unit included in a main body of the broadcast receiving device 11, for example.

The graphic processing unit 119 produces screen data to be displayed on the display unit 116 based on the graphics data received from the UIF providing unit 117 and outputs the screen data to the display unit 116.

Next, the PC 13 will be explained. The PC 13 includes a network interface unit (hereinafter referred to as 'NIF unit') 131, a control unit 132 and a memory unit 133.

The NIF unit 131 is an interface for sending and receiving information to/from the broadcast receiving device 11. The control unit 132 controls processing in the PC 13. More specifically, the control unit 132 sends and receives information to/from the Internet 14 via the broadcast receiving device 11, by executing a browser or the like. The control unit 132 transmits a graphical user interface for displaying on the display unit 116 of the broadcast receiving device 11 to the broadcast receiving device 11 via the NIF unit 131, on the basis of a function provided as a result of executing the VNC server software in the VNC described above. The control unit 132 receives the user event from the broadcast receiving device 11 via the NIF unit 131 and performs processing corresponding to the user event. The memory unit 133 stores data addressed in the PC 13. The memory unit 133 stores streaming data transmitted from the broadcast receiving device 11 via the NIF unit 131 and the like, for example.

Figure 2:
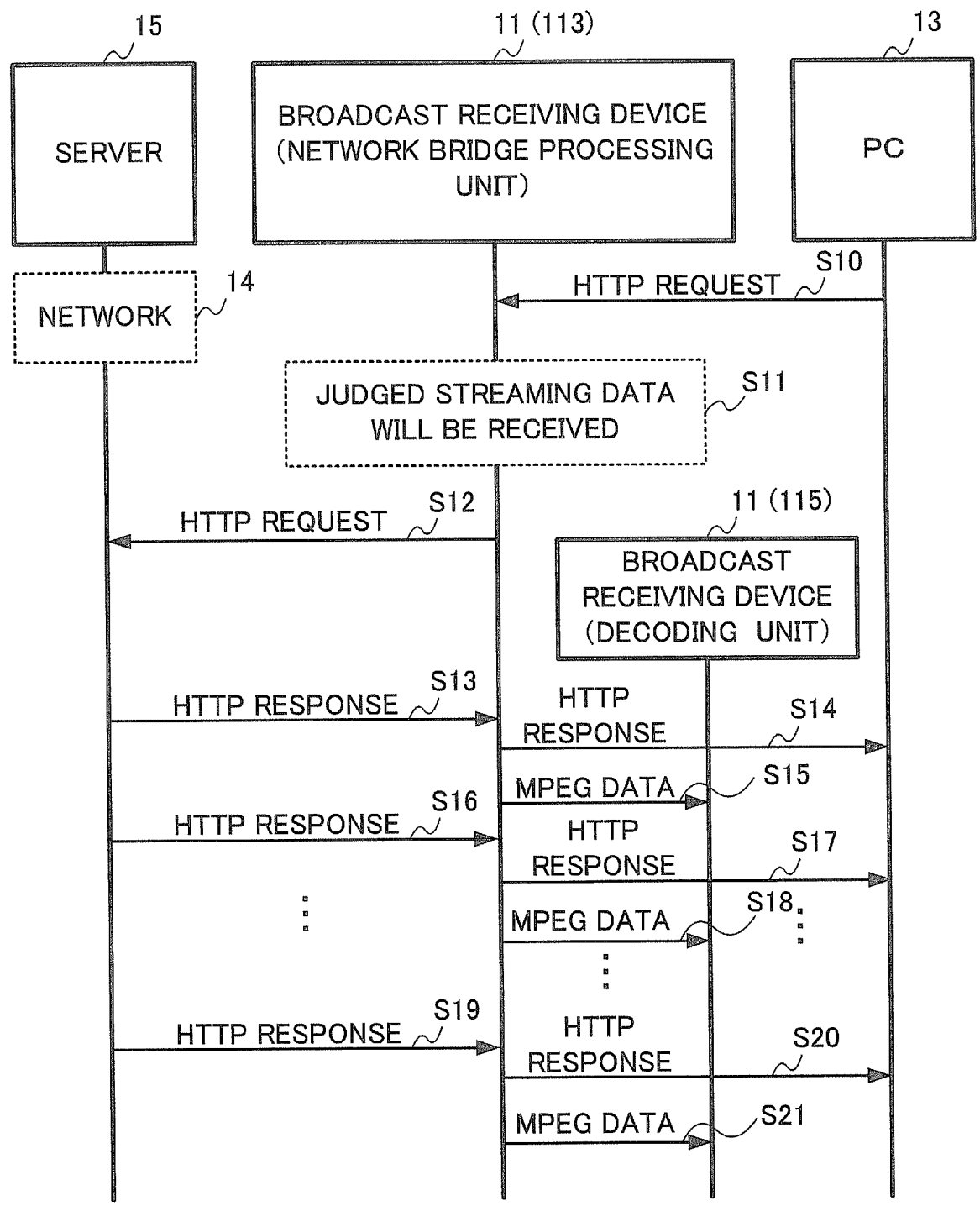
FIG. 2 is a sequence diagram illustrating an example of operations of the broadcast receiving system according to the first embodiment.

FIG. 2 is a sequence diagram illustrating an example of operations of the broadcast receiving system 10 according to the first embodiment. As illustrated in FIG. 1, when the Internet 14 and the PC 13 are communicably connected, the broadcast receiving device 11 is inserted between a network which is connected to the Internet 14 and another network to which the PC 13 belongs. Each of the networks which are connected to the first NIF unit 111 and the second NIF unit 112 is a network supporting TCP/IP which realizes HTTP-based communication, e.g., a network corresponding to an Ethernet (trademark) standard. However, the networks are not limited to this type. In FIG. 2, a server 15 is connected to the Internet 14 and distributes streaming data.

A user selects content by operating the input unit 118 while viewing a display screen of the display unit 116 of the broadcast receiving device 11, and then a user event corresponding to the content selecting operation is transmitted from the UIF providing unit 117 to the PC 13 via the second NIF unit 112. After the PC 13 receives the user event via the NIF unit 131, the control unit 132 produces a HTTP request REQ corresponding to the user event and sends the HTTP request REQ to the broadcast receiving device 11 (step S10). FIG. 3 is a diagram illustrating an example of a format of the HTTP request REQ. As illustrated in FIG. 3, the HTTP request REQ includes a request line REQ1 and a message header REQ2. When data is transmitted to the server 15 through the use of the HTTP request REQ, the message header REQ2 is followed by a blank line and then an entity body which includes the data to be transmitted is added.

Receiving the HTTP request REQ via the second NIF unit 112, the broadcast receiving device 11 supplies the HTTP request REQ to the network bridge processing unit 113. At the network bridge processing unit 113, the monitoring unit 114 reads the HTTP request REQ. Since the request line REQ1 contains a method 'GET' and a filename extension '.mpg', the monitoring unit 114 judges that MPEG streaming data will be transmitted as streaming data of the video content (step S11).

The network bridge processing unit 113 transmits the HTTP request REQ to the server 15 which is connected to the Internet 14, via the first NIF unit 111 (step S12).

Receiving the HTTP request REQ, the server 15 sends back a HTTP response RES indicating that the HTTP request REQ is successful (step S13). FIG. 4 is a diagram illustrating an example of a format of the HTTP response RES. As illustrated in FIG. 4, the HTTP response RES includes a status line RES1 and a message header RES2. When data is transmitted through the use of the HTTP response RES, the message header RES2 is followed by a blank line and then an entity body which includes requested MPEG data is added.

In the sequence illustrated in FIG. 2, at the step S11, the monitoring unit 114 judges that the streaming data of the video content will be transmitted. However, in some cases, it cannot be judged from the HTTP request that the streaming data of the video content will be transmitted. For example, when the PC 13 accesses a program on the server 15 which is called CGI (Common Gateway Interface), the request line is 'GET/path/script.cgi HTTP/1.0' or the like and the monitoring unit 114 cannot judge a type of data to be transmitted. In this case, the monitoring unit 114 monitors the message header in the HTTP response RES and judges whether or not the entity body includes the streaming data of the video content, based on information contained in a line 'Content-Type' of the message header (such as 'video' and a file identifier).

Receiving the HTTP response RES, the broadcast receiving device 11 supplies the HTTP response RES to the network bridge processing unit 113 via the first NIF unit 111. The network bridge processing unit 113 transfers the HTTP response RES to the PC 13 via the second NIF unit 112 (step S14). As it is already judged that the streaming data of the video content will be transmitted at the step S11, the monitoring unit 114 obtains the MPEG data from the entity body of the HTTP response RES and supplies the MPEG data to the decoding unit 115 (step S15). Then, the decoding unit 115 produces a decoded video signal and the display unit 116 displays a video based on the decoded video signal.

After that, the processing similar to that from the steps S13 to S15 is repeated (e.g., steps S16 to S21).

As described above, the broadcast receiving device 11 according to the first embodiment enables a user to search and select content on the Internet 14 through the use of the browser installed on the PC 13 or the like, by operating the input unit 118 while viewing the display unit 116 of the broadcast receiving device 11. Thus, the broadcast receiving device 11 can use the browser for PC which is used in the PC 13, and the broadcast receiving device 11 needs not include the browser for PC therein. Therefore, the broadcast receiving device 11 or the broadcast receiving system 10 according to the first embodiment makes available a website which is not available when a built-in browser on the broadcast receiving device 11 is used.

The second NIF unit 112 and the PC 13 are connected through the cross cable or the like in this example described above, whereas it is not limited to this configuration. For example, the second NIF unit 112 and the NIF unit 131 of the PC 13 may be configured by wireless communication units capable of wireless communication, where no cable is needed to connect the units. For another example, the second NIF unit 112 may be configured by a routing processing unit for performing routing a plurality of PCs 13, where the plurality of PCs 13 can be connected to the broadcast receiving device 11.

Second Embodiment

Figure 5:
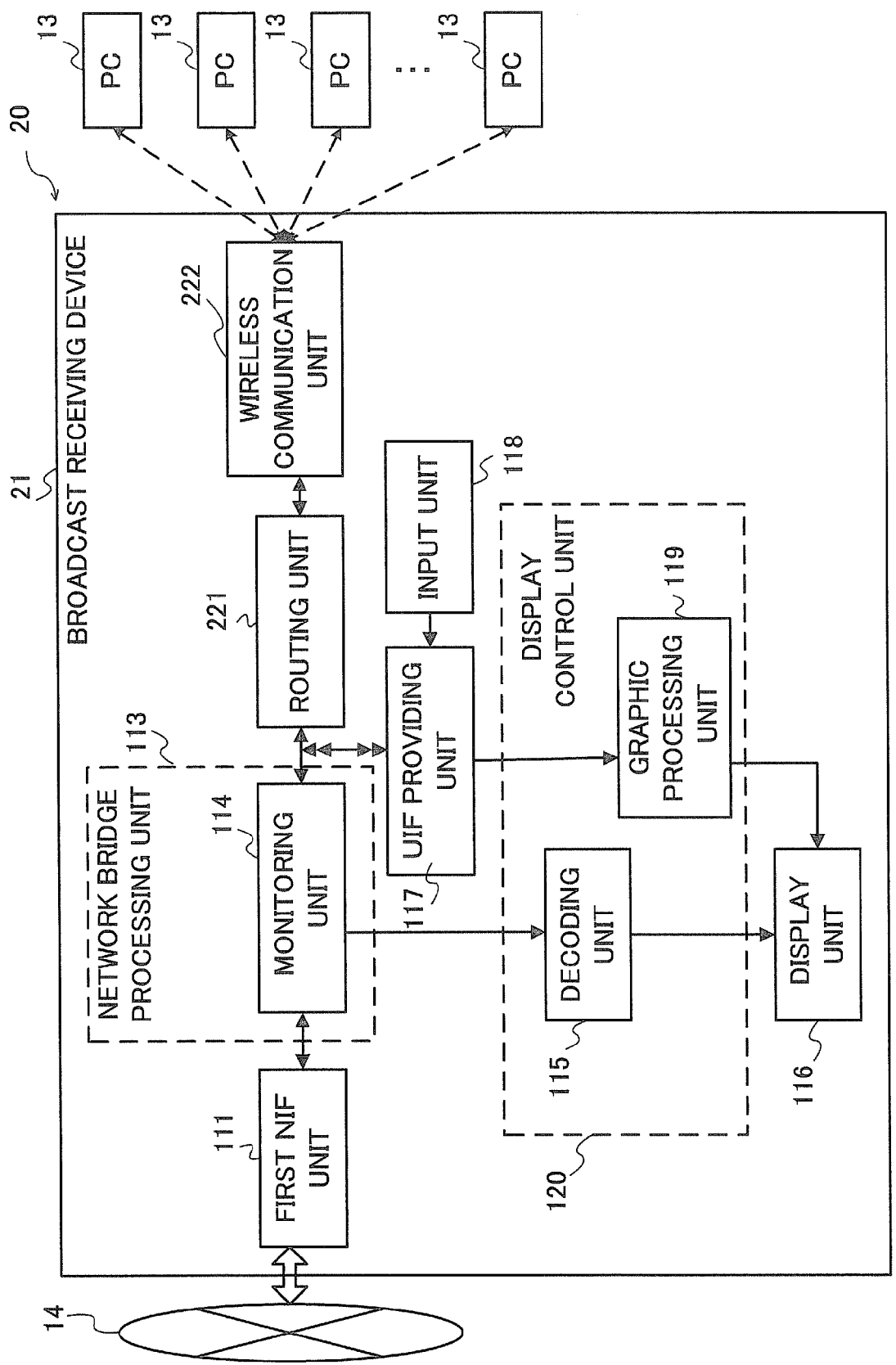
FIG. 5 is a block diagram schematically illustrating a structure of a broadcast receiving system according to a second embodiment.

FIG. 5 is a block diagram schematically illustrating a structure of a broadcast receiving system 20 according to a second embodiment. Elements in FIG. 5 that are the same as or correspond to those in FIG. 1 are assigned the same reference characters. As illustrated in FIG. 5, the broadcast receiving system 20 includes a broadcast receiving device 21 and a plurality of PCs 13. The broadcast receiving system 20 according to the second embodiment differs from the broadcast receiving system 10 according to the first embodiment in the following points that: the broadcast receiving device 21 differs from the broadcast receiving device 11 in configuration, and the broadcast receiving system 20 includes the plurality of PCs 13.

The broadcast receiving device 21 includes the first NIF unit 111, the network bridge processing unit 113, the monitoring unit 114, the decoding unit 115, the display unit 116, the UIF providing unit 117, the input unit 118, the graphic processing unit 119, and a routing unit 221 as a member of a second network communication unit, and a wireless communication unit 222 as another member of a second network communication unit. The broadcast receiving device 21 according to the second embodiment differs from the broadcast receiving device 11 according to the first embodiment in the following point that: the routing unit 221 and the wireless communication unit 222 are included instead of the second NIF unit 112 in FIG. 1. Moreover, in the second embodiment, the PC 13 includes a wireless communication unit (not illustrated in the drawing) instead of or in addition to the NIF unit 131.

The routing unit 221 obtains from the PC 13 an IP packet addressed to the Internet 14 via the wireless communication unit 222, converts address information in the IP packet into address information which is predetermined in the routing unit 221, and supplies the converted address information to the network bridge processing unit 113. Obtaining the IP packet, the network bridge processing unit 113 transfers the IP packet to a destination PC among the PCs 13 according to a routing table. The wireless communication unit 222 is an interface for performing wireless communication with the PCs 13. By including the routing unit 221 and the wireless communication unit 222 described above, the broadcast receiving device 21 can realize wireless communication between the plurality of PCs 13.

The broadcast receiving system 20 configured as described above is approximately the same as the broadcast receiving system 10 according to the first embodiment in basic operations: the display unit 116 displays a screen picture corresponding to a graphical user interface from the PC 13 which is connected to a wireless network, video content on the Internet 14 is selected, and then the display unit 116 displays the selected video content. By including the routing unit 221, the broadcast receiving device 21 can connect with the plurality of PCs 13 over a local network (the wireless network). Thus, the broadcast receiving device 21 can display a picture based on the video content on the Internet 14, if any one of the plurality of PCs 13 operates.

When some of the plurality of PCs 13 access the Internet 14 at the same time, the monitoring unit 114 specifies which PC among the plurality of PCs 13 has sent a request, based on a message header and the like. Then, the monitoring unit 114 causes the display unit 116 to display a video from streaming data of video content which is selected by a user or the like and corresponds to the request sent from the PC (one of the plurality of PCs 13).

As described above, according to the second embodiment, the broadcast receiving device 21 internally has a wireless LAN function and a router function, thereby capable of connecting the plurality of PCs 13 with each other over a local network, functioning as a gateway for internet access, accessing video content on the Internet through the use of one of the plurality of the PCs 13, and displaying a picture based on the video content. The broadcast receiving device 21 according to the second embodiment enables a user to search and select content on the Internet 14, through the use of a browser on the PC 13 or the like, by operating the input unit 118 while viewing the display unit 116 of the broadcast receiving device 21. Thus, the broadcast receiving device 21 can use the browser for PC which is used in a PC selected from the plurality of PCs 13, and the broadcast receiving device 21 needs not include the browser for PC therein. Therefore, the broadcast receiving device 21 or the broadcast receiving system 20 according to the second embodiment makes available a website which is not available when a built-in browser on the broadcast receiving device 21 is used.

Third Embodiment

FIG. 6 is a block diagram schematically illustrating a structure of a broadcast receiving system 30 according to a third embodiment. Elements in FIG. 6 that are the same as or correspond to those in FIG. 5 are assigned the same reference characters. As illustrated in FIG. 6, the broadcast receiving system 30 includes a broadcast receiving device 31 and a plurality of PCs 13. The broadcast receiving system 30 according to the third embodiment differs from the broadcast receiving system 20 according to the second embodiment in the following point that: the broadcast receiving device 31 differs from the broadcast receiving device 21 in configuration.

The broadcast receiving device 31 includes the network bridge processing unit 113 having the monitoring unit 114, the decoding unit 115, the display unit 116, the UIF providing unit 117, the input unit 118, the graphic processing unit 119, the routing unit 221, the wireless communication unit 222, and a cable communication unit 323 as a second network communication unit. The broadcast receiving device 31 according to the third embodiment differs from the broadcast receiving device 21 according to the second embodiment in that the cable communication unit 323 is included instead of the first NIF unit 111.

The cable communication unit 323 is an interface for connecting to the Internet 14 through the use of a cable television line and functions as a cable modem which is a modem for connecting to the cable television line. Due to having the cable communication unit 323, the broadcast receiving device 31 can address cable internet access which is recently widespread.

Generally, the cable internet access includes connecting a cable modem with a cable television terminal which is disposed near a TV. In order to connect a PC to the Internet by way of the cable internet access, it is necessary to provide an Ethernet cable or the like from a place near the TV to the PC.

In a case that the broadcast receiving device 31 according to the third embodiment is a digital broadcast receiving device capable of the cable internet access, it is enough to simply connect a cable television terminal and an RF input terminal of the broadcast receiving device 31 which has a built-in cable modem. The simple connection between the cable television terminal and the broadcast receiving device 31 through the use of a single cable enables to communicably connect the broadcast receiving device 31 with the plurality of PCs 13 on a local network. In this case, it is unnecessary to provide the Ethernet cable or the like. Thus, according to the third embodiment, the broadcast receiving device 31 enables a user to search and select content on the Internet 14 through the use of a browser on the PC 13 or the like, by operating the input unit 118 while viewing the display unit 116 of the broadcast receiving device 31. The broadcast receiving device 31 can use the browser for PC which is used in a PC selected from the plurality of PCs 13, and the broadcast receiving device 31 needs not include a browser for PC therein. Therefore, the broadcast receiving device 31 or the broadcast receiving system 30 according to the third embodiment makes available a website which is not available when a built-in browser on the broadcast receiving device 31 is used.

In the example described above, the broadcast receiving device 31 includes the cable communication unit 323 instead of the first NIF unit 111 of the broadcast receiving device 21 according to the second embodiment. However, it is not limited to this configuration and the cable communication unit 323 can be replaced by the first NIF unit 111 of the broadcast receiving device 11 according to the first embodiment.

Fourth Embodiment

FIG. 7 is a block diagram schematically illustrating a structure of a broadcast receiving system 40 according to a fourth embodiment. Elements in FIG. 7 that are the same as or correspond to those in FIG. 1 are assigned the same reference characters. As illustrated in FIG. 7, the broadcast receiving system 40 includes a broadcast receiving device 41 and a PC 13 as an information processing device.

The broadcast receiving device 41 includes the first NIF unit 111 as a first network communication unit, the second NIF unit 112 as a second network communication unit, a network bridge processing unit 413 having the monitoring unit 114 and a cache unit 440, the decoding unit 115, the display unit 116, the UIF providing unit 117, the input unit 118, and the graphic processing unit 119. The decoding unit 115 and the graphic processing unit 119 form the display control unit 120.

The network bridge processing unit 413 creates a bridge connection between the first NIF unit 111 and the second NIF unit 112. Thus, the PC 13 connected to the second NIF unit 112 can connect to the Internet 14 on a side of the first NIF unit 111 via the network bridge processing unit 413. The network bridge processing unit 413 includes the monitoring unit 114 for monitoring HTTP-based communication between the PC 13 and the Internet 14. If a link embedded in web screen data which is transmitted from the Internet 14 points to video streaming data, the monitoring unit 114 instructs to start download the data and to cache (temporarily record) the downloaded data in the cache unit 440. At the time, the web screen data is supplied to the PC 13 via the second NIF unit 112 and is displayed by using a browser.

The decoding unit 115 decodes the video streaming data which is selected by the monitoring unit 114 and read out from the cache unit 440 and supplies decoded video signal to the display unit 116. The display unit 116 displays a video corresponding to the video signal received from the decoding unit 115. The display unit 116 also displays a video corresponding to the screen data supplied from the graphic processing unit 119.

FIG. 8 is a sequence diagram illustrating an example of operations of the broadcast receiving system 40 according to the fourth embodiment. As illustrated in FIG. 7, when the Internet 14 and the PC 13 are connected, the broadcast receiving device 41 is inserted between a network which is connected to the Internet 14 and another network to which the PC 13 belongs. Here, each of the networks connected to the first NIF unit 111 and the second NIF unit 112 is a network supporting TCP/IP which realizes HTTP-based communication, e.g., a network corresponding to an Ethernet (trademark) standard. In FIG. 8, the server 15 is connected to the Internet 14 and distributes streaming data.

When a user inputs a URL of a website to be accessed by operating the input unit 118 while viewing a screen picture displayed on the display unit 116 of the broadcast receiving device 41, the inputted URL is transmitted from the UIF providing unit 117 to the PC 13 via the second NIF unit 112. After the PC 13 receives the URL via the NIF unit 131, the control unit 132 produces a HTTP request REQ in response to the received URL and sends the HTTP request REQ to the broadcast receiving device 41. Receiving the HTTP request REQ, the broadcast receiving device 41 supplies the HTTP request REQ to the network bridge processing unit 413 via the second NIF unit 112 (step S410). The network bridge processing unit 413 sends the HTTP request REQ to the server 15 connected to the Internet 14 via the first NIF unit 111 (step S412).

Receiving the HTTP request REQ, the server 15 sends back a HTTP response RES which is a successful response to the HTTP request REQ (step S413). Receiving the HTTP response RES, the broadcast receiving device 41 supplies the HTTP response RES to the network bridge processing unit 413 via the first NIF unit 111. The network bridge processing unit 413 transfers the HTTP response RES to the PC 13 via the second NIF unit 112 (step S414). At the time, the monitoring unit 114 extracts a link included in the response, starts downloading, monitors a message header of the HTTP response RES, and judges whether an entity body includes streaming data of video content or not, on the basis of information contained in a line 'Content-Type' of the HTTP response RES (such as 'video' and a file identifier). If it is judged that the streaming data is included, the monitoring unit 114 temporarily stores the streaming data in the cache unit 440 (steps S415 to S421).

Here, if video content is selected by using the browser displayed on the screen of the broadcast receiving device 41 via the UIF providing unit 117, the HTTP request REQ is sent from the second NIF unit 112 to the network bridge processing unit 413 in order to obtain a link which corresponds to the video content from the PC 13, as described above. The monitoring unit 114 monitors the HTTP request REQ from the PC 13, if a URL in the HTTP request agrees with the URL stored in the cache unit 440, stored data which corresponds to the URL is supplied from the cache unit 440 to the decoding unit 115 from the beginning of the data, while it continues to download data from the URL.

As described above, according to the fourth embodiment, the broadcast receiving device 41 enables a user to search and select content on the Internet 14 through the use of a browser on the PC 13 or the like, by operating the input unit 118 while viewing the display unit 116 of the broadcast receiving device 41. The broadcast receiving device 41 can use the browser for PC which is used in the PC 13, and the broadcast receiving device 41 needs not include a browser for PC therein. Therefore, the broadcast receiving device 41 or the broadcast receiving system 40 according to the fourth embodiment makes available a website which is not available when a built-in browser on the broadcast receiving device 41 is used.

In the example described above, the second NIF unit 112 and the PC 13 are connected through a cross cable or the like. However, it is not limited to this configuration: for example, the second NIF unit 112 and the NIF unit 131 of the PC 13 may be configured by wireless communication units capable of performing wireless communication, and no cable for connecting these elements is needed in this case. Moreover, the second NIF unit 112 may be configured by a routing processing unit for routing the plurality of PCs 13. In this case, it is possible to connect the broadcast receiving device 41 to a plurality of PCs 13. Furthermore, because streams are downloaded and stored in the cache unit 440 before a browser displays a content selection screen picture, displaying selected content on a screen of the broadcast receiving device 41 nearly coincides with selecting the content.

The fourth embodiment is the same as the first embodiment except for the point described above.

Fifth Embodiment

FIG. 9 is a block diagram schematically illustrating a structure of a broadcast receiving system 50 according to a fifth embodiment. Elements in FIG. 9 that are the same as or correspond to those in FIG. 7 are assigned the same reference characters. As illustrated in FIG. 9, the broadcast receiving system 50 includes a broadcast receiving device 51 and a PC 53 like the fourth embodiment. The broadcast receiving system 50 according to the fifth embodiment differs from the broadcast receiving system 40 according to the fourth embodiment in that the PC 53 additionally includes a software decoding unit 553 as a second decoding unit, a memory unit 552 which is a frame buffer, and a VNC server unit 551 which is VNC server software. The software decoding unit 553 and the VNC server unit 551 can be means implemented by PC software or means using PC software, and a user area in a RAM (not illustrated in the drawing) mounted in the PC 53 can be used as the memory unit 552. Thus, the software decoding unit 553, the memory unit 552 and the VNC server unit 551 can be realized without hardware, though these elements can be realized as hardware devices.

In the fifth embodiment, the broadcast receiving device 51 obtains streaming data via the first NIF unit 111 and supplies the data to the PC 53 via the network bridge processing unit 413 and the second NIF unit 112. Operations of the broadcast receiving device 51 are approximately the same as those in the fourth embodiment in basic operations. The fifth embodiment differs from the fourth embodiment in that: if the streaming data cannot be decoded by the decoding unit, the broadcast receiving device 51 receives software-decoded video data from the PC 53 by using a VNC protocol and displays the video on a screen by using a VNC viewer.

For Internet video streaming, contrary to TV broadcasting, there are various compression standards; if a new scheme is introduced, a decoding program corresponding to the newly introduced scheme is installed on a PC to display a video on a PC screen. On the other hand, since a compression standard is generally fixed for TV broadcasting, a typical broadcast receiving device has a hardware decoding unit and is difficult to cope with any newly introduced scheme.

When the broadcast receiving device 51 receives a stream which cannot be processed at the decoding unit 115, the broadcast receiving device 51 requests the PC 53 to decode the stream at the software decoding unit 553 and to transmit decoded video data to the broadcast receiving device 51 by using the VNC protocol.

In response to the request from the broadcast receiving device 51, the PC 53 decodes the video data and temporarily stores the data in the memory unit (such as a frame buffer) 552. The memory unit 552 works as an input buffer for the VNC server unit 551. A part of RAM area available for a user may be assigned as an area for the memory unit 552. The memory unit 552 works as a frame buffer for outputting the video, for the software decoding unit 553. The VNC server unit considers that the data in the frame buffer is displayed and transfers bit map data.

The broadcast receiving device 51 has a VNC viewer function and displays a picture based on the bit map data transferred from the PC 53 on the screen.

In the broadcast receiving device 51, even stream which cannot be decoded is stored in the cache unit 440, read out from the cache unit 440 in response to a request from the PC 53, and transmitted to the PC 53 via the second NIF unit 112. Thus, in this case also, it is possible to reduce a time required until displaying images starts.

As described above, according to the fifth embodiment, the broadcast receiving device 51 enables a user to search and select content on the Internet 14 through the use of a browser on the PC 53 or the like, by operating the input unit 118 while viewing the display unit 116 of the broadcast receiving device 51. The broadcast receiving device 51 can use the browser for PC which is used in the PC 53, and the broadcast receiving device 51 needs not include a browser for PC therein. Therefore, the broadcast receiving device 51 or the broadcast receiving system 50 according to the fifth embodiment makes available a website which is not available when a built-in browser on the broadcast receiving device 51 is used. Moreover, in a case of streaming data which cannot be decoded by the built-in decoding unit 115, the video is decoded at the PC 53 and the broadcast receiving device 51 receives bit map data of the decoded video from the PC 53. Thus, even if receiving stream compressed by way of a new scheme, the broadcast receiving device 51 can display a video by installing software corresponding to the new scheme on the PC 53.

The fifth embodiment is the same as the fourth embodiment except for the points described above.

Modified Example

By including a broadcast receiving unit which has a tuner and the like and is not illustrated in the drawings, each of the broadcast receiving devices 11, 21, 31, 41 and 51 according to the first to fifth embodiments can receive a broadcast signal such as a digital TV broadcasting signal and display a video corresponding to the broadcast signal on the display unit 116.

Although the broadcast receiving devices 11, 21, 31, 41 and 51 according to the first to fifth embodiments are television receiving devices in the examples described above, each of the broadcast receiving devices 11, 21, 31, 41 and 51 may be information recording/reproducing devices such as a video recording/reproducing device, a DVD recording/reproducing device, and a BD (Blu-Ray Disc) recording/reproducing device. In a case that the broadcast receiving device 11, 21, 31, 41 or 51 is an information recording/reproducing device without having an image displaying unit, the broadcast receiving device 11, 21, 31, 41 or 51 is provided with an output interface unit for outputting video and audio to an external display device not illustrated in the drawings.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A broadcast receiving device comprising:
    a display control unit for causing a display unit to display a video based on received data;
    an input unit, through which information input operation is performed;
    a first network communication unit communicably connected to the Internet;
    a second network communication unit communicably connected to an information processing device;
    a network bridge processing unit for creating a bridge connection between the first network communication unit and the second network communication unit to make possible communication between the information processing device and the Internet; and
    a user interface providing unit which receives a graphical user interface used for accessing the Internet and generated by the information processing device via the second network communication unit and supplies graphics data based on the graphical user interface to the display control unit, the user interface providing unit supplying information inputted from the input unit to the information processing device via the second network communication unit.

2. The broadcast receiving device according to claim 1, wherein the network bridge processing unit includes a monitoring unit for monitoring communication data inputted to the first network communication unit, obtaining the video data from the communication data if the communication data is judged to include video data, and supplying the video data to the display control unit.

3. The broadcast receiving device according to claim 1, further comprising a cache unit for temporarily storing communication data inputted via the first network communication unit.

4. The broadcast receiving device according to claim 1, wherein:
    the user interface providing unit is a unit on which client software for virtual network computing is installed, and the information processing device is a device on which server software for the virtual network computing is installed.

5. The broadcast receiving device according to claim 1, wherein the second network communication unit includes a wireless communication unit for performing wireless communication.

6. The broadcast receiving device according to claim 1, wherein the second network communication unit includes a routing processing unit for performing routing.

7. The broadcast receiving device according to claim 1, wherein the second network communication unit includes a wireless communication unit for performing wireless communication and a routing processing unit for performing routing.

8. The broadcast receiving device according to claim 1, wherein the first network communication unit includes a cable communication unit functioning as a cable modem.

9. The broadcast receiving device according to claim 2, wherein if a HTTP request transmitted from the information processing device includes identification information for obtaining video data, the monitoring unit judges that a response to the HTTP request includes the video data.

10. The broadcast receiving device according to claim 2, wherein if a HTTP response transmitted to the information processing device includes identification information of video data, the monitoring unit judges that the HTTP response includes the video data.

11. The broadcast receiving device according to claim 3, wherein the network bridge processing unit includes a monitoring unit for monitoring communication data inputted to the first network communication unit, obtaining the video data from the communication data if the communication data is judged to include video data, and storing the video data in the cache unit.

12. The broadcast receiving device according to claim 3, wherein the communication data temporarily stored in the cache unit includes data obtained from a link included in a web page obtained via the first network communication unit.

13. A broadcast receiving system comprising:
    the broadcast receiving device according to claim 1; and
    an information processing device communicably connected to the second network communication unit of the broadcast receiving device;
    wherein the information processing device includes:
    a second decoding unit for decoding video data included in communication data received via the first network communication unit, the network bridge processing unit and the second network communication unit of the broadcast receiving device;
    a memory unit for temporarily storing the video data decoded by the second decoding unit; and
    a server unit for transferring the video data stored in the memory unit to the broadcast receiving device as bit map data.

14. The broadcast receiving system according to claim 13, wherein:
    the second decoding unit is a unit for decoding by using software, and
    the server unit is a unit for transferring the video data to the broadcast receiving device by using server software for virtual network computing.

* * * * *